US011115742B2

(12) United States Patent
Normann

(10) Patent No.: US 11,115,742 B2
(45) Date of Patent: Sep. 7, 2021

(54) MICROPHONE ASSEMBLY AND MICROPHONE ARRANGEMENT

(71) Applicant: PEIKER acustic GmbH, Friedrichsdorf (DE)

(72) Inventor: Marcus Normann, Friedrichsdorf (DE)

(*) Notice: Subject to any disclaimer, the term of this patent is extended or adjusted under 35 U.S.C. 154(b) by 0 days.

(21) Appl. No.: 16/766,027

(22) PCT Filed: Nov. 28, 2018

(86) PCT No.: PCT/EP2018/082788
§ 371 (c)(1),
(2) Date: May 21, 2020

(87) PCT Pub. No.: WO2019/105978
PCT Pub. Date: Jun. 6, 2019

(65) Prior Publication Data

US 2020/0382854 A1 Dec. 3, 2020

(30) Foreign Application Priority Data

Nov. 28, 2017 (DE) ..................... 10 2017 128 048.0

(51) Int. Cl.
*H04R 1/08* (2006.01)
*B60R 11/02* (2006.01)
*H04R 1/04* (2006.01)
*H04R 1/16* (2006.01)

(52) U.S. Cl.
CPC ............ *H04R 1/08* (2013.01); *B60R 11/0247* (2013.01); *H04R 1/04* (2013.01); *H04R 1/16* (2013.01); *H04R 2499/13* (2013.01)

(58) Field of Classification Search
CPC ... H04R 1/08; H04R 1/04; H04R 1/16; H04R 2499/13; B60R 11/0247
USPC .......................................................... 381/355
See application file for complete search history.

(56) References Cited

U.S. PATENT DOCUMENTS 6,329,925 B1 * 12/2001 Skiver ....................... B60R 1/12 340/815.4
6,560,344 B1 * 5/2003 Julstrom ................ H04R 1/406 381/356
2009/0175480 A1 * 7/2009 Zhou .................... H04R 1/1058 381/375

(Continued)

FOREIGN PATENT DOCUMENTS

JP H03-96933 U 10/1991
KR 20090005999 U 6/2009

OTHER PUBLICATIONS

International Search Report and Written Opinion in corresponding International Application PCT/EP2018/082788, dated Feb. 15, 2019 (14 pages).

*Primary Examiner* — Sean H Nguyen
(74) *Attorney, Agent, or Firm* — Osha Bergman Watanabe & Burton LLP

(57) ABSTRACT

A microphone assembly is disclosed. The microphone assembly includes a first housing part, a second housing part, a microphone capsule and a printed circuit board. The microphone capsule and the printed circuit board are received in an inner space of a housing formed by the two housing parts, which includes a viewing part that can be connected to the housing, as well as at least one first elastic clip element for attaching the microphone assembly to an interior lining.

15 Claims, 4 Drawing Sheets

(56) References Cited

U.S. PATENT DOCUMENTS

Figure 1:
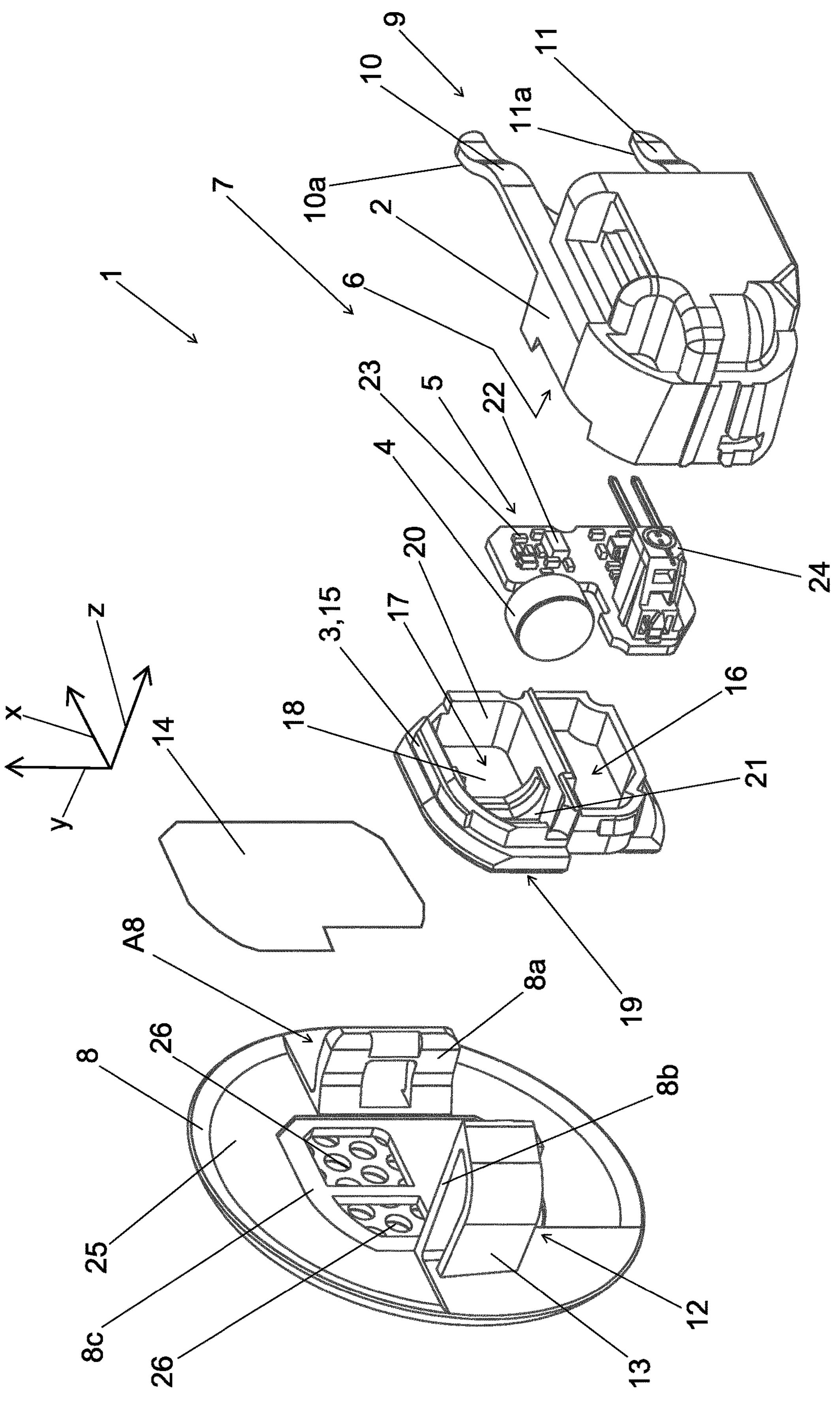

| | | | | |
|---|---|---|---|---|
| 2009/0245565 | A1* | 10/2009 | Mittleman | H04R 1/025 381/365 |
| 2009/0257613 | A1* | 10/2009 | Khamashta | H04R 1/04 381/355 |
| 2011/0062302 | A1 | 3/2011 | Choi | |
| 2014/0072141 | A1* | 3/2014 | Cohen | H04R 1/04 381/91 |

* cited by examiner

MICROPHONE ASSEMBLY AND MICROPHONE ARRANGEMENT

The invention relates to a microphone assembly according to the preamble of claim 1 or 2 and a microphone arrangement according to the preamble of claim 14 or 15.

KR 2009 0005999 U has disclosed a microphone assembly which comprises a first housing part, a second housing part, a microphone capsule and a circuit board, wherein the microphone capsule and the circuit board are received in an interior space of a housing formed by the two housing parts, which comprises a visible part, wherein the visible part is connectable to the housing, and which comprises at least one first elastic clamping element for the fixing of the microphone assembly to an interior paneling. This microphone assembly is also provided for installation into a roof lining.

It is an object of the invention to propose an improved microphone assembly, wherein it is the intention in particular for the microphone assembly to be reliably installable on an interior paneling and to provide high-quality acoustic signals despite a simple construction.

It is furthermore an object of the invention to propose an improved microphone arrangement which comprises a microphone assembly and an interior paneling or console, wherein it is the intention for reliable installation to be ensured and for high-quality acoustic signals to be provided despite a simple construction.

Said object is achieved, proceeding from the features of the preamble of claims 1 and 2 and 14 and 15, by means of the respective characterizing features. Advantageous and expedient refinements are specified in the respective subclaims.

In its first embodiment variant, in the case of the microphone assembly according to the invention, the at least one first elastic clamping element is formed on the microphone assembly such that, for the generation of a first clamping force, a spacing between a support surface of the visible part and a pressure surface of the first clamping element is variable while maintaining the first clamping force, such that the microphone assembly is fastenable with self-clamping action in a recess of interior panelings of different thickness. In the case of such an embodiment and configuration of the microphone assembly, it is possible for the microphone assembly to be used both for vehicles with a thin interior paneling with a thickness of for example 2.5 mm and for vehicles with a thick interior paneling with a thickness of for example 6.2 mm. It is thus possible, for example, for the same microphone assemblies to be installed in passenger motor vehicles and in heavy goods vehicles, giving rise to all advantages associated with greater unit quantities. Here, the invention is also characterized by the fact that the microphone assembly is, with regard to an elasticity of its first clamping means, designed such that the clamping means is suitable for interior panelings in the case of which a thick interior paneling has a thickness up to 3 times that of a thin interior paneling.

The microphone assembly according to the invention is installed on the interior paneling such that, in an installed state of the microphone assembly, the visible part can be placed in contact by way of its support surface against a visible side, pointing toward an interior compartment of a vehicle, of the first or second interior paneling, and such that, in an installed state of the microphone assembly, the clamping element can be placed in contact by way of its pressure surface against a rear side, situated opposite the visible side, of the first or second interior paneling. This results in clamping of the interior paneling over a large area and thus in an effective manner.

In its second design variant, the second housing part of the microphone assembly comprises a bearing and damping means, wherein the microphone capsule and the circuit board are received by the bearing and damping means so as to be held in the interior space of the housing. In this way, the circuit board and the microphone capsule are decoupled from vibrations or oscillations, and thus a recording quality is improved and a service life of the components is lengthened.

In combination with the first design variant of the invention as claimed in claim 2, provision is made whereby the second housing part of the microphone assembly comprises a bearing and damping means, wherein the microphone capsule and the circuit board are received by the bearing and damping means so as to be held in the interior space of the housing. In this way, the circuit board and the microphone capsule are decoupled from vibrations or oscillations which reduce a recording quality and/or reduce a service life of the components.

In combination with the second design variant of the invention as claimed in claim 1, provision is made, in the case of the microphone assembly, whereby the at least one first elastic clamping element is formed on the microphone assembly such that, for the generation of a first clamping force, a spacing between a support surface of the visible part and a pressure surface of the first clamping element is variable while maintaining the first clamping force, such that the microphone assembly is fastenable with self-clamping action in a recess of interior panelings of different thickness. In the case of such an embodiment and configuration of the microphone assembly, it is possible for the microphone assembly to be used both for vehicles with a thin interior paneling with a thickness of for example 2.5 mm and for vehicles with a thick interior paneling with a thickness of for example 6.2 mm. It is thus possible, for example, for the same microphone assemblies to be installed in passenger motor vehicles and in heavy goods vehicles, giving rise to all advantages associated with greater unit quantities.

Here, the invention is also characterized by the fact that the microphone assembly is, with regard to an elasticity of its first clamping means, designed such that the clamping means is suitable for interior panelings in the case of which a thick interior paneling has a thickness up to 3 times that of a thin interior paneling.

The microphone assembly according to the invention is installed on the interior paneling such that, in an installed state of the microphone assembly, the visible part can be placed in contact by way of its support surface against a visible side, pointing toward an interior compartment of a vehicle, of the first or second interior paneling, and such that, in an installed state of the microphone assembly, the clamping element can be placed in contact by way of its pressure surface against a rear side, situated opposite the visible side, of the first or second interior paneling. This results in clamping of the interior paneling over a large area and thus in an effective manner.

Provision is furthermore made whereby the first clamping element is formed with at least one clamping arm and is in particular formed as a fork-shaped clamping element with at least two clamping arms and

- either is connected to the visible part and in particular formed integrally with the visible part
- or is connected to the housing and in particular to the first housing part and is in particular formed integrally therewith. By means of a fork-shaped design with multiple clamping arms, the microphone assembly can be particularly reliably clamped to the interior paneling, because the individual clamping arms can adjust to tolerances in the thickness of the interior paneling, and each clamping arm thus ensures optimum clamping. By means of a connection of the clamping element to the visible part, the visible part can also be fitted on the interior paneling in advance, without the housing. By means of a connection of the clamping element to the housing, an installation process is particularly straightforward, because the clamping element does not need to be guided through the recess of the interior paneling, but rather can be simply moved onto the rear side of the interior paneling. By means of a connection of the clamping element to the first housing part, the clamping element is situated in an optimum position relative to the interior paneling. By virtue of the clamping element being formed integrally with the visible parts or with the housing or with the first housing part, additional components and thus sources of error are avoided.

Provision is also made whereby the microphone assembly comprises a second clamping element, wherein the second clamping element is formed such that, by means thereof, a second clamping force can be exerted which is oriented transversely with respect to an installation direction oriented in a z direction. In this way, the microphone assembly is better anchored in the recess of the interior paneling and can in particular also compensate for tolerances of the recess.

With regard to the second clamping element, provision is made either for this to be connected to the housing and in particular to the first housing part and in particular formed integrally therewith, or for this to be connected to the visible part and in particular formed integrally with the visible part. By means of a connection of the second clamping element to the visible part, the visible part can also be fitted on the interior paneling in advance, without the housing. By means of a connection of the clamping element to the housing, an installation process is particularly straightforward, because the clamping element does not need to be guided into the recess of the interior paneling from the visible side, but rather can be plugged in from the rear side of the interior paneling without regard to any slight damage. By means of a connection of the second clamping element to the first housing part, the clamping element is situated in an optimum position relative to the interior paneling. By virtue of the clamping element being formed integrally with the visible parts or with the housing or with the first housing part, additional components and thus sources of error are avoided.

Provision is also made whereby the second housing part is formed by the bearing and damping means, and wherein provision is in particular made whereby the bearing and damping means is connected to the first housing part by means of at least one detent connection and/or whereby the bearing and damping means is at least half-surrounded by the first housing part. In this way, firstly, the number of individual components is kept low, whereby in particular the installation process is simplified. Secondly, as a result of the detent engagement of the two housing parts, the installation process is likewise simplified, wherein, by virtue of the second housing part engaging deep into the first housing part, good guidance of the component during the detent engagement process is ensured and good cohesion of the two housing parts is ensured.

Provision is furthermore made whereby the second housing part is enclosed between the first housing part and the visible part, wherein the visible part is connected to the first housing part by means of at least one detent connection. In this way, optimum cohesion between the three components of first housing part, second housing part and visible part is realized.

Provision is also made whereby the second housing part comprises a first opening and a second opening, wherein the microphone capsule is held on the second housing part so as to be positioned between the two openings. In this way, optimum access for the sound to the microphone capsule is realized without the use of further components. In this way, it is in particular also the case that, without any further measures, the sound chambers situated in front of and behind the microphone capsule have a damping action because they are formed in the bearing and damping means.

Provision is also made for the microphone assembly to be equipped with a sound-permeable element, wherein the sound-permeable element covers the openings and is in particular received between the second housing part and the visible part or the console. In this way, the sound chambers can easily be formed as sound chambers which are protected on all sides, such that it is not necessary for a protective material to be installed in the recess of the interior paneling.

Provision is furthermore made whereby the microphone capsule is connected to the circuit board and whereby the circuit board is received in particular with clamping action in a trough formed on the second housing part, wherein the second housing part is in particular formed from an elastically deformable plastic and preferably from rubber. In this way, an elastic suspension of circuit board and microphone capsule is ensured, wherein the circuit board can be clamped into the trough without the use of further components so as to be permanently mounted in a shielded and damped manner, or mechanically decoupled. The microphone capsule is mounted indirectly via the circuit board to which it is connected by means of wires, though may, in order to optimize its mounting, bear against the second housing part or be held likewise with clamping action by the latter.

Provision is also made whereby the second clamping means has a pressure surface which is oriented orthogonally with respect to the pressure surface of the first clamping element, wherein the pressure surface is, in an installed state of the microphone assembly, oriented such that the pressure surface lies against a side wall of a recess of the interior paneling. In this way, the microphone assembly is better anchored in the recess of the interior paneling and can in particular also compensate for tolerances of the recess.

The first design variant of the microphone arrangement, which comprises a microphone assembly and an interior paneling, provides for the microphone assembly to be designed as claimed in claim 1 and in particular at least one of claims 4 to 13, wherein the visible part lies with its support surface against a visible side of the interior paneling, wherein the first clamping element lies with its pressure surface against a rear side, situated opposite the visible side, of the interior paneling, and wherein the second clamping part lies with its pressure surface against a side wall of the recess. In the case of such an embodiment and configuration of the microphone arrangement, it is possible for the microphone arrangement to be used both for vehicles with a thin interior paneling with a thickness of for example 2.5 mm and for vehicles with a thick interior paneling with a thickness of for example 6.2 mm. It is thus possible, for example, for the same microphone arrangements to be installed in passenger motor vehicles and in heavy goods vehicles, giving rise to all advantages associated with greater unit quantities.

The second design variant of the microphone arrangement, which comprises a microphone assembly and a console, provides for the microphone assembly to be designed as claimed in claim 2 and in particular at least one of claim 3, 8, 10 or 12, and for the console to comprise, on a rear side averted from a visible side, a receiving device into which the microphone assembly can be engaged with detent action by way of its housing. In this way, the circuit board and the microphone capsule are decoupled from vibrations or oscillations, and thus a recording quality is improved and a service life of the components is lengthened.

In the context of the invention, an interior paneling is to be understood as a paneling such as for example a so-called vehicle headlining or the like, by means of which a passenger compartment or a load compartment of a vehicle is lined in the direction of the bodyshell. Here, an interior paneling is to be understood in particular to mean a sound-absorbing, soft, fabric-like material.

In the context of the invention, a console is to be understood to mean a shell-like or faceplate-like component which may for example also be formed as a lamp dome or overhead console.

Further details of the invention will be described in the drawing on the basis of schematically illustrated exemplary embodiments.

Figure 2:
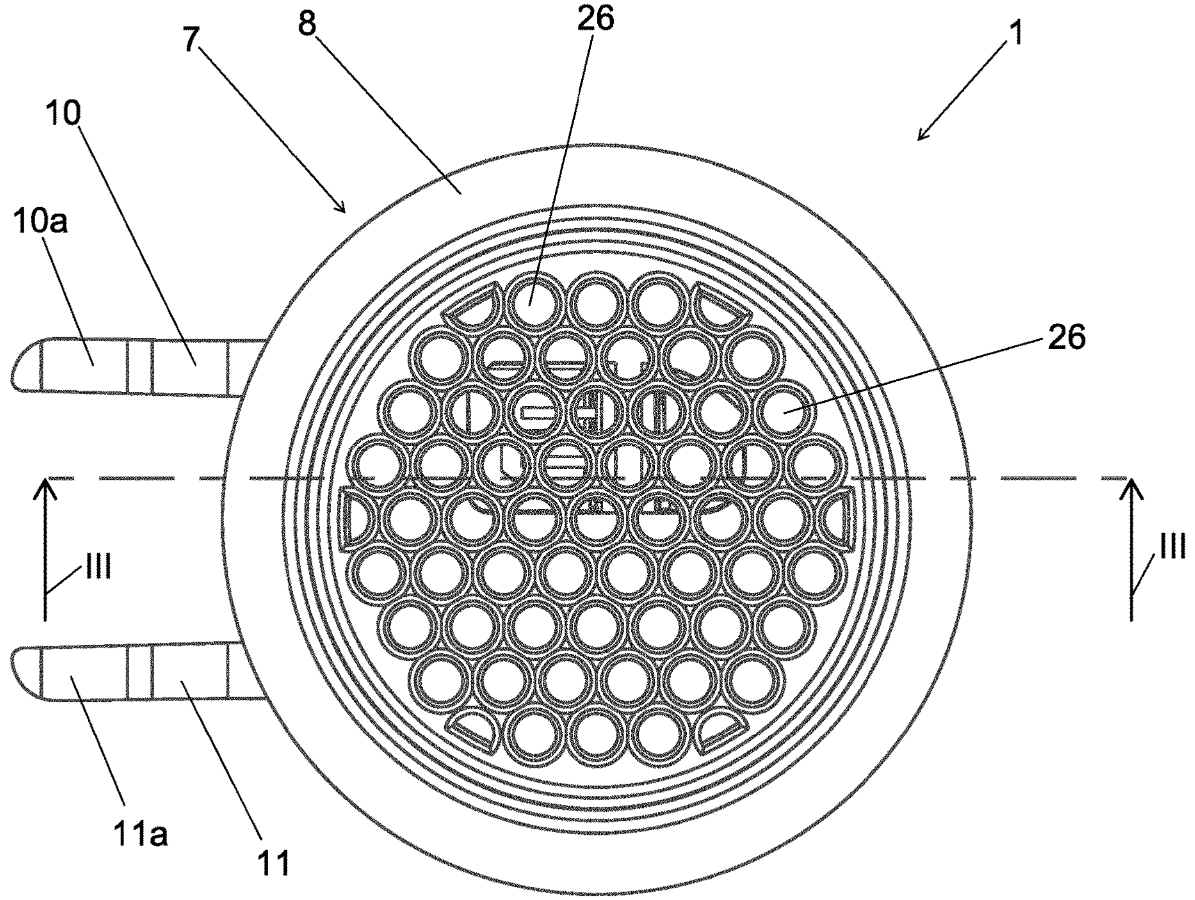
Figure 3:
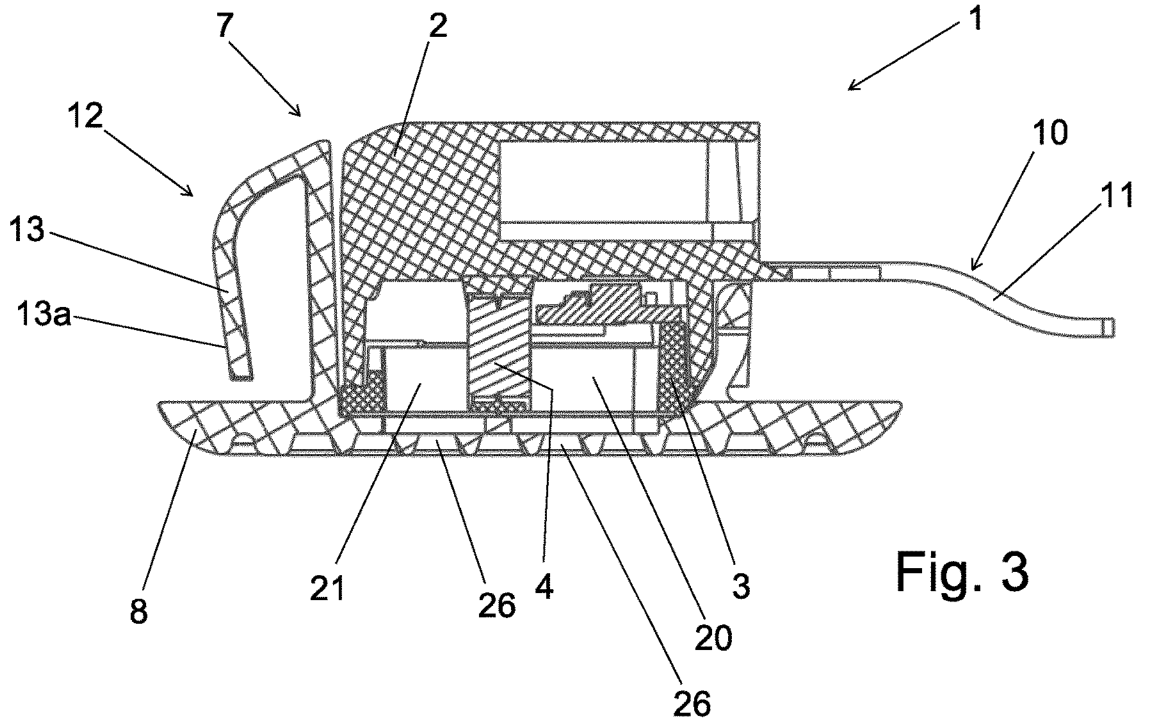
Figures 4, 5:
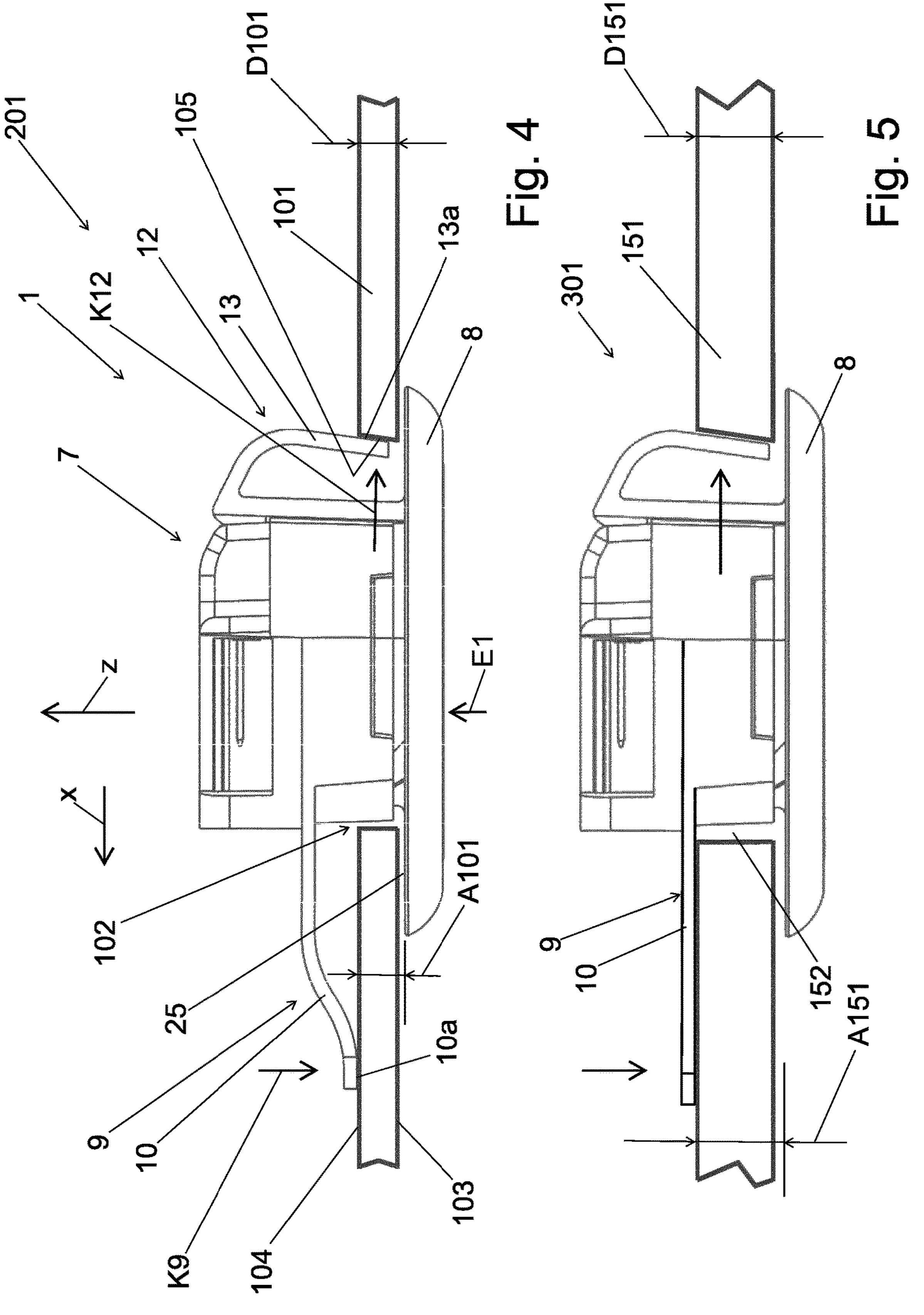
Figure 6:
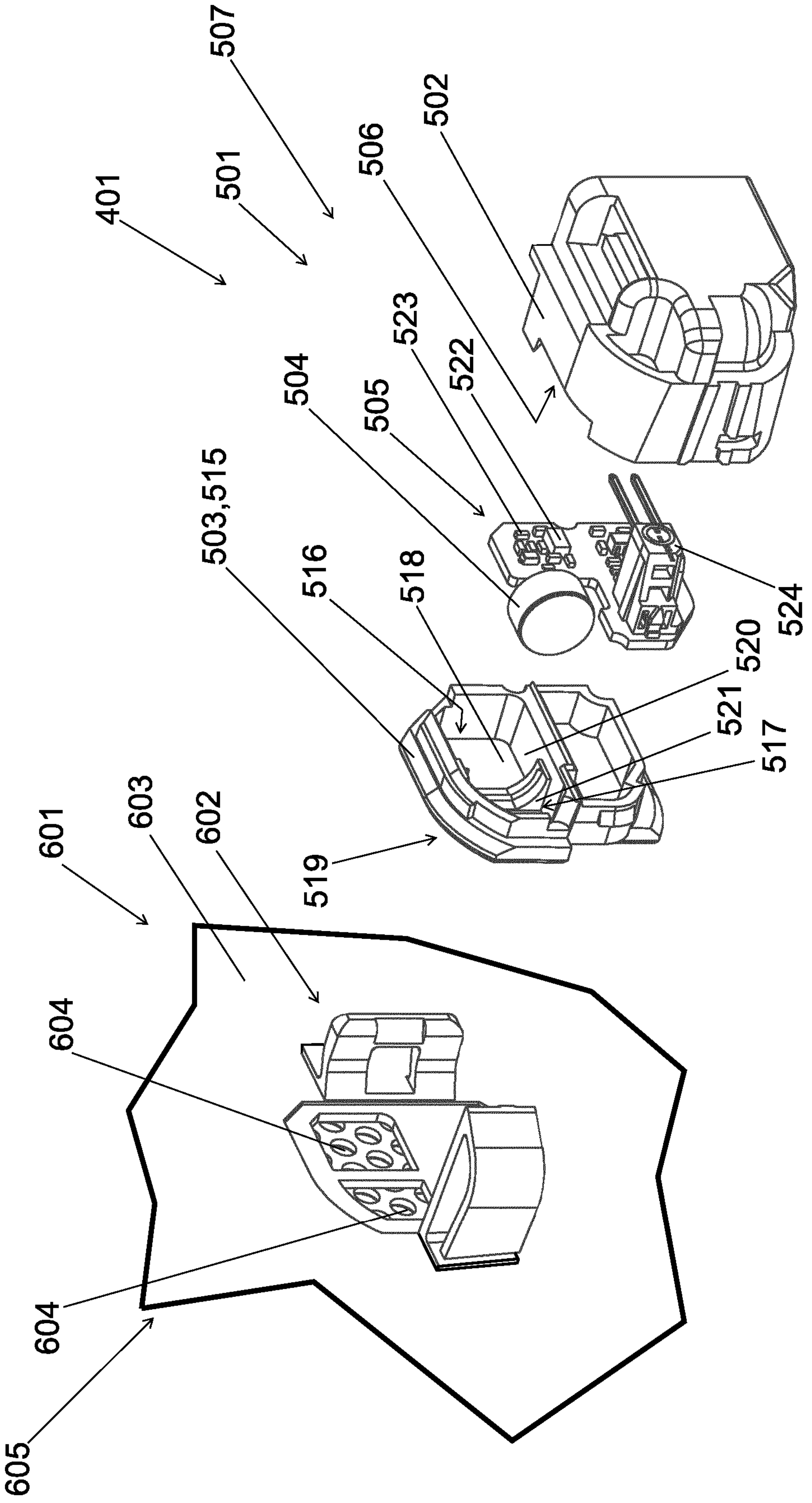

In the drawing:

FIG. 1: shows an exploded view of a first design variant of a microphone assembly;

FIG. 2: shows a plan view of the microphone assembly shown in FIG. 1 in the assembled state;

FIG. 3: shows a sectional view through the illustration of FIG. 3 correspondingly to the section line III-III shown in FIG. 2;

FIG. 4: shows a side view of a first microphone arrangement which comprises the microphone assembly shown in FIG. 2 and an interior paneling with a first thickness;

FIG. 5: shows a side view of a second microphone arrangement which comprises the microphone assembly shown in FIG. 2 and an interior paneling with a second thickness; and FIG. 6: shows a side view of a third microphone arrangement which comprises a second design variant of a microphone assembly and a console with a receiving device.

FIG. 1 illustrates a first design variant of a microphone assembly 1 in an exploded view. The microphone assembly 1 comprises a first housing part 2, a second housing part 3, a microphone capsule 4 and a circuit board 5. The microphone capsule 4 and the circuit board 5 are received in an interior space 6 of a housing 7 formed by the two housing parts 2, 3. The microphone assembly 1 furthermore comprises a visible part 8 formed as a grille or faceplate. In an assembled state of the microphone assembly 1, in which the microphone assembly 1 is shown in FIGS. 2 and 3, the visible part 8 is connected to the housing 7. For the installation of the microphone assembly 1 on a first interior paneling 101 shown in FIG. 4, which is designed as a so-called headlining and has a thickness D101, or on an interior paneling 151 shown in FIG. 5, which has a thickness D151, the microphone assembly 1 comprises a first clamping element 9. Said clamping element 9 is connected to the first housing part 2 or formed integrally therewith as an injection-molded part. Here, the clamping element 9 is formed as a fork-shaped clamping element and comprises a first clamping arm 10 and a second clamping arm 11. The microphone assembly 1 furthermore comprises a second clamping element 12. This clamping element 12 is connected to the visible part 8 and is formed in one piece with the visible part 8 as an injection-molded part. The second clamping element 12 comprises a clamping limb 13. Also schematically shown in FIG. 1 is a sound-permeable material 14, which is optionally installed between the visible part 8 and the lower housing part 3. The sound-permeable material is formed as a so-called acoustic mesh.

The microphone assembly 1 is assembled in such a way that the circuit board 5 and the microphone capsule 4 are inserted as a preassembled unit into the first housing part 2. A unit consisting of the first housing part 2, the circuit board 5 and the microphone capsule 4 is then mounted on the second housing part 3. Here, the second housing part 3 is formed as a bearing and damping means 15 which comprises a first trough 16 and a second trough 17, into which the circuit board 5 and the microphone capsule 4 are pressed during the installation process and then connected by means of an elastic deformation of the second housing part 3. The second trough 17, in which the microphone capsule 4 is also received, has a first opening 18 and a second opening 19 to the visible part 8. These openings 18, 19 are closed off in the direction of the visible part 8 by means of the abovementioned sound-permeable material 14. Thus, a first sound chamber 20 and a second sound chamber 21 are formed in the second trough 17. The circuit board 5 comprises electronic components 22, 23 (merely designated by way of example) and an electrical plug connection 24.

As a result of the two housing parts 2, 3 being joined together, the circuit board 5 and the microphone capsule 4 are received in the interior space 6 of the housing 7. In a further step, the sound-permeable material 14 is then adhesively bonded onto the second housing part 2.

Finally, the visible part 8 is connected to the completed housing 7. For installation on said interior paneling 101, the microphone assembly 1 is then pushed behind the interior paneling 101 from a visible side 103 of the interior paneling 101—that is to say proceeding from a vehicle interior compartment—with the clamping arms 10, 11 through a recess 102 formed in the interior paneling 101 such that the clamping arms 10, 11 come to lie with their pressure surfaces 10*a*, 11*a* against a rear side 104 of the interior paneling 101. As the microphone assembly 1 is pivoted in further, its clamping limb 13 then bears against a side wall 105 of the recess 102 and braces the fully inserted microphone assembly 1 in the recess 102 of the interior paneling 101. During the pivoting-in movement, the visible part 8 comes to lie by way of its ring-like support surface 25 against the visible side 103 of the interior paneling 101 and then also the housing 7 comes to lie by way of its first clamping element 9 and its pressure surfaces 10*a*, 11*a* against the rear side 104 of the interior paneling 101 with elastic deformation of the clamping arms 10, 11 thereof, such that the interior paneling 101 is clamped in by the microphone assembly 1. Installation of the microphone assembly 1 on the interior paneling 151 (see FIG. 5) takes place similarly to the described installation of the microphone assembly on the interior paneling 101. In the position illustrated in FIGS. 4 and 5, the interior paneling 101 or 151 has in each case been clamped by the microphone assembly 1. During the above-described installation of the microphone assembly, a detent engagement of the visible part 8 with the completed housing 7 by means of a first detent arm 8*a*, which is situated opposite the second clamping element 12, and a second detent arm 8*b* has taken place. Here, the second detent arm 8*b* is formed by the second clamping element 12. The two detent arms 8*a*, 8*b* together with a depression 8*c* form a receiving device A8 for the completed housing 7. Here, the two detent arms 8*a* and 8*b* engage on opposite sides in the first housing part 2 in a form-fitting manner as soon as the completed housing 7 has been fully inserted into a depression 8*c* of the visible part 8 (see FIG. 1).

When the microphone assembly has been fully installed on the interior paneling 101 or 151, the clamping element 9 presses by way of its pressure surfaces 10*a* and 11*a* in each case with a first clamping force K9 along a z-axis against the first interior paneling 101 or the second interior paneling 151. Furthermore, the clamping element 12 presses by way of its pressure surfaces 13*a* of its clamping limb 13 in each case with a second clamping force K12 along an x-axis against a side wall 105 of the recess 102. The second clamping force K12 is oriented transversely with respect to an installation direction E1 in which the microphone assembly 1 is inserted into the recess 102. The first clamping force K9 running in the z-axis and the second clamping force K12 running in the x-axis are oriented orthogonally with respect to one another. The visible part 8 comprises a multiplicity of sound passage openings 26 through which the sound can pass through the sound-permeable material 14 into the first sound space 20 and the second sound space 21 and thus to the microphone capsule 4.

The second clamping element 12 is supported—as described—by way of a pressure surface 13*a* formed on its clamping limb 13 against the side wall 105 of the recess 102 of the interior paneling 101. By means of clamping in the recess 102, the microphone assembly 1 is held in the x and y directions on the interior paneling 101 with clamping action and, by means of clamping against the visible side 103 and the rear side 104, the microphone assembly 1 is held in the z direction on the interior paneling 101 with clamping action (see FIGS. 1 and 4).

As can be seen from a comparative consideration of the already mentioned FIGS. 4 and 5, the microphone assembly 1 is suitable both for fastening to the interior paneling 101 as well as to the interior paneling 151, even though these have different thicknesses D101 and D151. FIG. 5 schematically illustrates the elastic deformation of the first clamping element 9 or the elastic deformation of its clamping arms 10, 11.

Together with the interior paneling 101 or 151, the microphone assembly 1 forms a first microphone arrangement 201 or a second microphone arrangement 301 respectively. A typical value for the thickness D101 of a thin interior paneling 101 is 2.5 mm. A typical value for the thickness D151 of a thick interior paneling 151 is 6.2 mm.

The first clamping element 9 is arranged and designed such that a spacing between the support surface 25 of the visible part 8 and the pressure surfaces 10*a*, 11*a* of the first clamping element 9 can be varied while avoiding plastic deformation of the first clamping element 9 and while maintaining a first clamping force K9, such that the microphone assembly 1 can be fastened in a self-clamping manner both in the recess 102 of the first interior paneling 101 with the first thickness D101 and in a recess 152 or installation opening of the second interior paneling 151 with the second thickness D151. Here, in the case of the microphone assembly 1 being installed with the first interior paneling 101, the pressure surface 10*a* or 11*a* of the first clamping element 9 has a spacing A101 to the support surface 25 of the visible part. Here, in the case of the microphone assembly 1 being installed with the second interior paneling 151, the pressure surface 10*a* or 11*a* of the first clamping element 9 has a spacing A151 to the support surface 25 of the visible part. The spacings A101 and A151 correspond approximately to the thicknesses D101 and D151 respectively, wherein FIGS. 4 and 5 are to be understood as schematic illustrations.

FIG. 6 shows a third microphone arrangement 401 in an exploded view. This third microphone arrangement 401 comprises a second design variant of a microphone assembly 501 and a console 601 with a receiving device 602. The microphone assembly 501 comprises a first housing part 502, a second housing part 503, a microphone capsule 504 and a circuit board 505. The microphone capsule 504 and the circuit board 505 are received in an interior space 506 of a housing 507 formed by the two housing parts 502, 503. Optionally, analogously to FIG. 1, a sound-permeable material (not illustrated) is provided which is installed with the lower housing part 503. The microphone assembly 501 is assembled in such a way that the circuit board 505 and the microphone capsule 504 are inserted into the second housing part 503. The second housing part 503 is formed as a bearing and damping means 515 which has a first trough 516 and a second trough 517, into which the circuit board 505 and the microphone capsule 504 are pressed and then fixed by means of an elastic deformation of the second housing part 503. The second trough 517, in which the microphone capsule 504 is also received, has a first opening 518 and a second opening 519. These openings 518, 519 are closed off by means of the abovementioned sound-permeable material. Thus, a first sound chamber 520 and a second sound chamber 521 are formed in the second trough 517. The circuit board 505 comprises electronic components 522, 523 (merely designated by way of example) and an electrical plug connection 524. After the insertion of the circuit board 505 and of the microphone capsule 504 into the second housing part 503, the second housing part 503 is closed off by means of the first housing part 502, such that the circuit board 505 and the microphone capsule 504 are received in the interior space 506 of the housing 507. In a further step, the sound-permeable material is then adhesively bonded onto the second housing part 502.

For the connection of the second microphone assembly 501 to the console 601, the second microphone assembly 501 is then pressed into the receiving device 602 formed on a rear side 603 of the console 601, wherein the second microphone assembly 501 in this case engages with detent action into the receiving device 602 of the console 601. In the region of the receiving device 602, the console 601 has sound passage openings 604 which extend through the console 601 from the rear side 603 to a visible side 605.

LIST OF REFERENCE DESIGNATIONS

1 Microphone assembly
2 First housing part of 7
3 Second housing part of 7
4 Microphone capsule
5 Circuit board
6 Interior space of 7
7 Housing
8 Visible part
8*a* First detent arm of 8
8*b* Second detent arm of 8, formed by 12
8*c* Depression of 8
9 First clamping element on 2 or 7
10 First clamping arm of 9
10*a* Pressure surface of 9
11 Second clamping arm of 9
12 Second clamping element on 8
13 Clamping limb of 12
13*a* Pressure surface of 12
14 Sound-permeable material
15 Bearing and damping means

16 First trough of 3 or 15
17 Second trough of 3 or 15
18, 19 First, second opening of 17
20 First sound chamber in 17
21 Second sound chamber in 17
22, 23 Electronic components of 5
24 Electrical plug connection of 5
25 Support surface of 8
26 Sound passage opening of 8
A8 Receiving device of 8 for 7
E1 Installation direction
K9 First clamping force of 9
K12 Second clamping force of 12
101 First interior paneling
102 Recess in 101
103 Visible side of 101
104 Rear side of 101
105 Side wall of 102
A101 Spacing between 10*a*, 11*a* and 25
D101 Thickness of 101
151 Second interior paneling
152 Recess in 151
A151 Spacing between 10*a*, 11*a* and 25
D151 Thickness of 151
201 First microphone arrangement
301 Second microphone arrangement
401 Third microphone arrangement
501 Microphone assembly
502 First housing part of 50
503 Second housing part of 507
504 Microphone capsule
505 Circuit board
506 Interior space of 507
507 Housing
515 Bearing and damping means
516 First trough of 503 or 515
517 Second trough of 503 or 515
518, 519 First, second opening of 517
520 First sound chamber in 517
521 Second sound chamber in 517
522, 523 Electronic components of 505
524 Electrical plug connection of 505
601 Console
602 Receiving device
603 Rear side of 601
604 Sound passage opening
605 Visible side

The invention claimed is:

1. A microphone assembly, comprising:
a first housing part;
a second housing part;
a microphone capsule;
a circuit board, wherein the microphone capsule and the circuit board are received in an interior space of a housing formed by the two housing parts;
a visible part, wherein the visible part is connectable to the housing;
at least one first elastic clamping element for the fixing of the microphone assembly to an interior paneling,
wherein the at least one first elastic clamping element is formed on the microphone assembly such that, for the generation of a first clamping force, a spacing between a support surface of the visible part and a pressure surface of the first clamping element is variable while maintaining the first clamping force, such that the microphone assembly is fastenable with self-clamping action in a recess of interior panelings of different thickness.

2. The microphone assembly as claimed in claim 1, wherein the second housing part comprises a bearing and damping means and wherein the microphone capsule and the circuit board are received by the bearing and damping means so as to be held in the interior space of the housing.

3. The microphone assembly as claimed in claim 1, wherein the first clamping element is formed as a fork-shaped clamping element with at least two clamping arms and is formed integrally with the visible part or is connected to the first housing part and is formed integrally therewith.

4. The microphone assembly as claimed in claim 1, further comprising: a second clamping element, wherein the second clamping element is formed such that, by means thereof, a second clamping force is exerted which is oriented transversely with respect to an installation direction oriented in a z direction.

5. The microphone assembly as claimed in claim 1, wherein the second clamping element is connected to the first housing part and is formed integrally therewith, or the second clamping element is connected to and formed integrally with the visible part.

6. The microphone assembly as claimed in claim 1, wherein the second housing part is formed by the bearing and damping means, and wherein provision is in particular made whereby the bearing and damping means is connected to the first housing part by at least one detent connection and/or whereby the bearing and damping means is at least half-surrounded by the first housing part.

7. The microphone assembly as claimed in claim 1, wherein the second housing part is enclosed between the first housing part and the visible part, wherein the visible part is connected to the first housing part by at least one detent connection.

8. The microphone assembly as claimed claim 1, wherein the second housing part comprises a first opening and a second opening, wherein the microphone capsule is held on the second housing part as to be positioned between the two openings.

9. The microphone assembly as claimed in claim 8, wherein the microphone assembly comprises a sound-permeable element, wherein the sound-permeable element covers the openings and is in particular received between the second housing part and the visible part or the console.

10. The microphone assembly as claimed in claim 1, wherein the microphone capsule is connected to the circuit board and the circuit board is received with clamping action in a trough formed on the second housing part, wherein the second housing part is in formed from rubber.

11. The microphone assembly as claimed in claim 1, wherein the second clamping means has a pressure surface which is oriented orthogonally with respect to the pressure surface of the first clamping element, wherein the pressure surface is, in an installed state of the microphone assembly, oriented such that the pressure surface lies against a side wall of a recess of the interior paneling.

12. A microphone assembly, comprising:
a first housing part;
a second housing part;
a microphone capsule;
a circuit board, wherein the microphone capsule and the circuit board are received in an interior space of a housing formed by the two housing parts;
a visible part, wherein the visible part is connectable to the housing; and at least one first elastic clamping element for the fixing of the microphone assembly to an interior paneling, wherein the second housing part comprises a bearing and damping means and wherein the microphone capsule and the circuit board are received by the bearing and damping means so as to be held in the interior space of the housing.

13. The microphone assembly as claimed in claim 12, wherein the at least one first elastic clamping element is formed on the microphone assembly such that, for the generation of a first clamping force, a spacing between a support surface of the visible part and a pressure surface of the first clamping element is variable while maintaining the first clamping force, such that the microphone assembly is fastenable with self-clamping action in a recess of interior panelings of different thickness.

14. A microphone arrangement comprising a microphone assembly as claimed in claim 12; and a console, wherein the console comprises, on a rear side averted from a visible side, a receiving device into which the microphone assembly is engaged with detent action by way of its housing.

15. A microphone arrangement comprising:

a microphone assembly; and an interior paneling, wherein the microphone assembly comprises:

a first housing part, a second housing part, a microphone capsule, a circuit board, wherein the microphone capsule and the circuit board are received in an interior space of a housing formed by the two housing parts, a visible part connectable to the housing, and at least one first elastic clamping element for fixing of the microphone assembly to an interior paneling, wherein the at least one first elastic clamping element is formed on the microphone assembly such that, for the generation of a first clamping force, a spacing between a support surface of the visible part and a pressure surface of the first clamping element is variable while maintaining the first clamping force, such that the microphone assembly is fastenable with self-clamping action in a recess of interior panelings of different thickness, wherein the visible part lies with its support surface against a visible side of the interior paneling, wherein the first clamping element lies with its pressure surface against a rear side, situated opposite the visible side, of the interior paneling, and wherein the second clamping element lies with its pressure surface against a side wall of the recess.

* * * * *